July 21, 1925.
R. McCARTY
EMERGENCY BRAKE
Filed Dec. 16, 1924
1,547,055
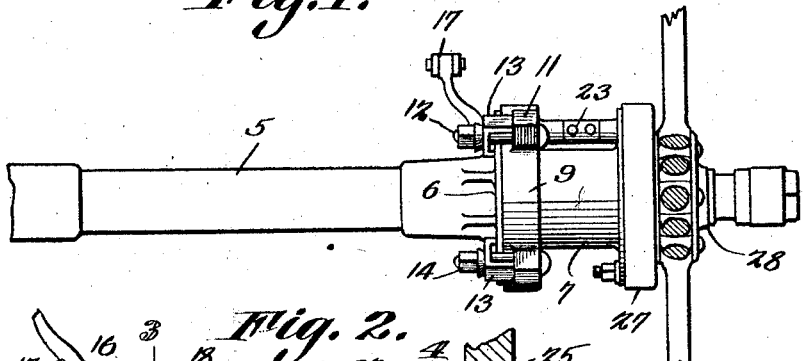
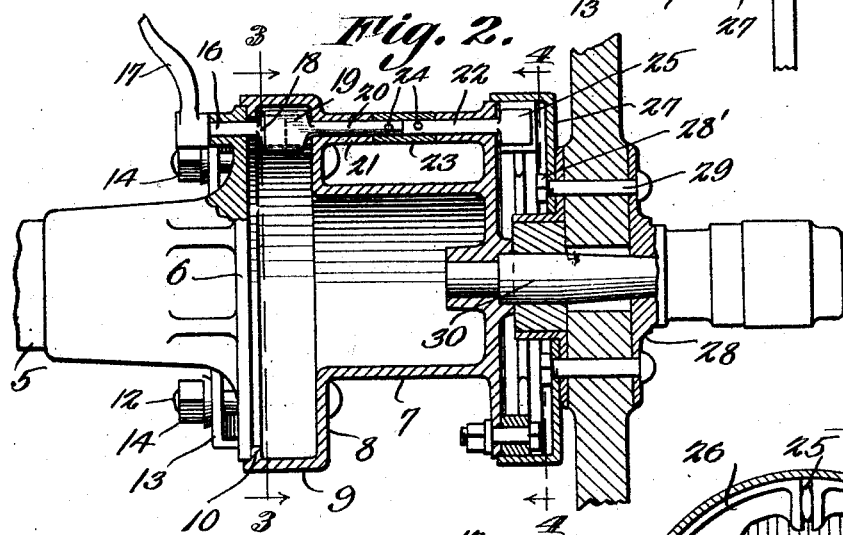
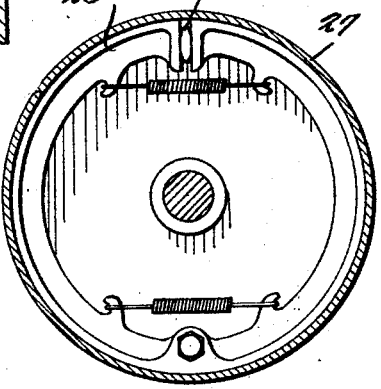
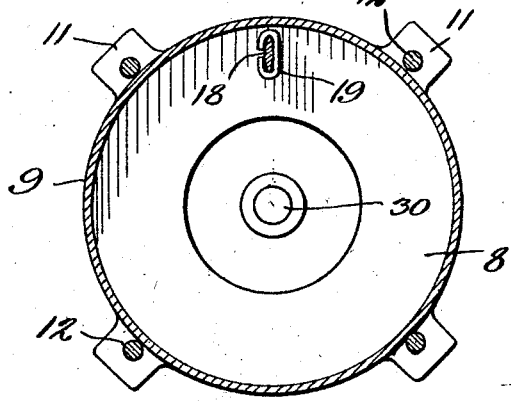
Inventor
Rush McCarty
By C. A. Snow & Co.
Attorneys Patented July 21, 1925.

1,547,055

UNITED STATES PATENT OFFICE.

RUSH McCARTY, OF PINEVILLE, LOUISIANA.

EMERGENCY BRAKE.

Application filed December 16, 1924. Serial No. 756,293.

*To all whom it may concern:*

Be it known that I, RUSH MCCARTY, a citizen of the United States, residing at Pineville, in the parish of Rapides and State of Louisiana, have invented a new and useful Emergency Brake, of which the following is a specification.

This invention relates to emergency wheels especially designed for use in connection with broken rear axles of motor vehicles, the primary object of the invention being to provide an emergency wheel having means whereby the usual brake may be used to control the movements of the disabled vehicle while it is being towed.

An important object of the invention is to provide a wheel of this character which may be readily and easily secured to the usual rear axle housing, novel means being provided for connecting the usual brake operating mechanism to the brake band forming a part of the wheel construction.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view of an axle disclosing an emergency wheel constructed in accordance with the invention as positioned thereon.

Figure 2 is a longitudinal sectional view through the emergency wheel and its axle.

Figure 3 is a sectional view taken on line 3—3 of Figure 2.

Figure 4 is a sectional view taken on line 4—4 of Figure 2.

Referring to the drawing in detail, the emergency axle forming the subject matter of this invention is shown as secured to one end of the axle housing 5 which is of the usual construction and provided with the flanged member 6 at one end, forming one wall of the usual brake drum.

The emergency axle is shown as including a hollow section 7 formed with an outwardly extended portion 8 which is supplied with a flange 9, providing a construction similar to the usual brake drum. This flange 9 is formed with an inwardly extended rib 10 that provides a shoulder against which the flange member 6 engages to provide a close fit between the auxiliary axle and the flanged member 6.

Bosses indicated at 11 are formed on the flange 9, which bosses are supplied with suitable openings to receive the securing bolts 12 that pass therethrough and engage the clamps 13 that are drawn into close engagement with the flange member 6 by means of the nuts 14, thereby providing means for securely mounting the auxiliary wheel and axle, forming the invention.

The usual brake band expanding arm is indicated at 16 and is operated by means of the lever 17 that is connected with the usual brake rods. The expanding head which fits between the adjacent ends of the brake sections is indicated at 18, and when the emergency wheel and axle are mounted, the expanding head 18 fits into the socket member 19 formed at one end of the rod 20 that passes through the tubular bearing 21, formed integral with the outwardly extended portion 8 of the hollow section 7. Cooperating with the rod 20 is a rod 22 which is connected with the rod 20 by means of the tubular member 23 which is shown as positioned over the adjacent ends of the rods 20 and 22 and secured in position by means of the pins 24.

Formed integral at one end of the rod 22 is an expanding head 25 that fits between the adjacent ends of the brake member which is indicated at 26, and shown more clearly by Figure 4 of the drawing.

The brake drum against which the brake member 26 operates is indicated at 27 and is secured to the emergency wheel 28 by means of the bolts 29 that are shown as extended through the hub of the wheel and into openings formed in the brake drum 27, where they are supplied with securing nuts 28'. Supported by the tubular section 7 is a stub axle 30 on which the wheel 28 is mounted for rotation, the usual securing means not shown, and hub cap being supplied to finish the wheel construction.

From the foregoing it will be seen that should the rear axle of the vehicle become broken, the wheel may be removed together with the brake member positioned in the brake drum forming a part of the wheel. The auxiliary wheel and axle are now positioned on the flanged member 6 in a manner as shown by Figure 2 of the drawing, whereupon the bolts 12 and securing nuts 14 are properly positioned to secure the hollow section 7 in position.

When the emergency wheel is mounted, the expanding head 18 is positioned in the socket member 19 so that as the member 17 and rod 16 are rotated, a relative movement will be imparted to the rod 20 and rod 22 that carries the head 25 positioned between the adjacent brake sections of the emergency wheel.

Should it be desired to operate the brake to retard the movement of the disabled vehicle being towed, it will be obvious that such braking of the vehicle will be accomplished in the usual manner, through the rods 20, 22 and brake sections 26 which are caused to operate against the inner surface of the brake drum.

I claim:—

1. An emergency wheel and axle including a hollow section adapted to be secured to the flanged end of an axle housing, an axle carried by the hollow section, a wheel mounted to rotate on the axle, a drum carried by the wheel, a sectional brake member mounted in the drum, and means for operating the brake section to retard the movement of the wheel mounted on the axle.

2. An emergency wheel and axle including a tubular section, means for securing the tubular section to the flanged end of an axle housing, a wheel mounted for rotation at one end of the tubular section, a brake drum forming a part of the wheel, and means supported by the tubular section and adapted to engage within the brake drum to retard the movement of the wheel.

3. An emergency wheel and axle including a tubular section having an outwardly extended portion terminating in a flanged portion, a rib on the flanged portion providing a seat, said seat adapted to be moved into engagement with the flanged end of an axle housing, clamping members carried by the tubular section and adapted to engage the flanged section for removably securing the tubular section to the axle housing, an auxiliary wheel carried by the tubular section and having a brake drum, and means for engaging the brake drum for retarding the movement of the auxiliary wheel.

4. An emergency wheel and axle including a tubular section, means for securing the tubular section to the flanged end of an axle housing, an axle carried by the tubular section, a wheel having a brake drum mounted for rotation on the axle, a brake member within the brake drum, and means for operating the brake member to retard the movement of the auxiliary wheel.

5. An emergency wheel and axle including a tubular section, means for securing the tubular section to the flanged end of an axle housing, a rod extending through the flanged end of the housing and carrying an expanding head on one end thereof, a rod having a socket member to receive the head, a rod having an expanding head, connected with the rod carrying the socket member, a wheel mounted for rotation adjacent to the tubular member, said wheel having a brake drum, brake sections in the brake drum, and said last mentioned expanding head adapted to operate between the brake sections to expand them to retard the movement of the wheel.

In testimony that I claim the foregoing as my own, I have hereto affixed my signature in the presence of two witnesses.

RUSH McCARTY.

Witnesses:
J. W. AVERY,
E. E. BUCKNER.